UNITED STATES PATENT OFFICE.

EDMUND G. WAYMAN, OF LOUISVILLE, KENTUCKY, ASSIGNOR TO ROBERT V. SNODGRASS, OF SAME PLACE.

IMPROVEMENT IN PREPARING HEMP AND FLAX FIBER FOR THE MANUFACTURE OF DUSTERS, &c.

Specification forming part of Letters Patent No. 74,736, dated February 18, 1868.

*To all whom it may concern:*

Be it known that I, EDMUND G. WAYMAN, of the city of Louisville, in the county of Jefferson and State of Kentucky, have invented a new and improved mode for using the fiber of hemp or flax by servants, housewives, shopmen, or clerks in the removal of dust or any light substances, which I desire may be better known as Wayman's Duster.

I do hereby declare that the following is a full and exact description thereof, reference being had to the accompanying drawings and the letters of reference thereon.

The nature of my invention consists in providing one-half pound of clean hemp or flax fiber, thoroughly hackled, and by the requisite manipulations and preparation to augment the elasticity and durability of the raw material, and reduce it to practical usefulness in the chamber, office, shop, or store as an invaluable duster.

No abstruse problem in art, science, or mechanism is pretended to be solved; but it is earnestly claimed that the simplicity of my discovery cannot detract from it its intrinsic worth, or lessen the weight of my claim as the inventor.

To enable others skilled in the art to make and use my invention, I will proceed to describe its construction and operation.

For construction of a duster of the ordinary size, I take one-half pound of dew-rotted hemp or flax, after having cut it to the length of fourteen inches; then draw it through a fine hackle or comb until each fiber is thoroughly cleansed from all foreign substance; it is then saturated in a solution, generally composed of one-half pound of sal-soda, one pound lard, to ten gallons of water, raised to a temperature of about 110° Fahrenheit. It is then allowed to dry, and is again saturated in a solution of alum and water, the constituent parts being one pound of the former to one gallon of the latter. The fiber is then colored, according to the taste of the operator, but most generally with a preparation of equal quantities of citric acid and solferino, say one pound of each, dissolved in ten gallons of soft water, and raised to a temperature of 120°.

The merit in thus treating the raw material is in this, that it imparts a sort of elastic toughness to each fiber. Thus prepared, the quantity necessary to make one duster, (say one-half pound,) and of the aforesaid length of fourteen inches, is held in a horizontal position, the center resting on a metal thimble, one inch in diameter, when the handle is drove into the thimble, forcing the strands or fibers in with it, care being observed to have the strands equally distributed around the sides of said thimble. By simply reversing the strands or fibers, with the butt of the thimble pointing toward the ends of the fiber, all that remains to be done to perfect my new duster is to confine the fiber in this reversed condition, by tying with strong twine around the thimble, and driving a small nail or brad through the thimble into the handle, (which is made of seasoned wood and turned to a convenient shape and length.) This twine is also covered with a neat strip of morocco or oil-cloth. We then have the hemp duster complete.

What I claim as my invention, and desire to secure by Letters Patent, is—

The preparation and application of hemp and flax fiber in the production of a duster, the preparation and manufacture to take place as herein described, or any other substantially the same, and which will produce the intended effect, or the same results.

EDMUND G. WAYMAN.

Witnesses:
G. M. SMITH,
ANNA E. SMITH.